United States Patent [19]

Christy et al.

[11] 4,382,549
[45] May 10, 1983

[54] IRRIGATION EMITTER

[76] Inventors: Mark H. Christy, 1534 E. Edinger, Santa Ana, Calif. 92705; Lloyd Spencer, 220 Patrician Way, Pasadena, Calif. 91105

[21] Appl. No.: 199,523

[22] Filed: Oct. 22, 1980

Related U.S. Application Data

[63] Continuation of Ser. No. 9,753, Feb. 5, 1979, abandoned.

[51] Int. Cl.³ .................. A01G 25/16; B05B 1/08
[52] U.S. Cl. .................................. 239/106; 138/46; 239/542
[58] Field of Search ............... 239/106–109, 239/272, 542, 547, 570; 138/43, 46; 137/516.29, 517, 859

[56] References Cited

U.S. PATENT DOCUMENTS

| | | | |
|---|---|---|---|
| 2,989,086 | 6/1961 | Dahl | 138/43 |
| 3,807,430 | 4/1974 | Keller | 239/542 X |
| 4,011,893 | 3/1977 | Bentley | 239/542 X |

Primary Examiner—Andres Kashnikow
Attorney, Agent, or Firm—Bacon & Thomas

[57] ABSTRACT

An irrigation emitter including a housing forming a chamber having diverging inlet and outlet walls, the diverging walls forming an apex which receives an end of an emitter plate therebetween; the emitter plate, when subject to pressure at the inlet wall below a predetermined low pressure occupying a position closing the inlet; the emitter plate, when subject to greater low pressure, forming momentarily with the outlet wall a flush flow outlet passage; the confronting surfaces of the outlet wall and emitter plate defining therebetween a drip flow passage. The emitter plate may be circular or rectangular and the portion of the chamber between the emitter plate and outlet wall may be enlarged to effect pressure reducing turbulent flow prior to discharge.

9 Claims, 11 Drawing Figures

IRRIGATION EMITTER

This is a continuation of application Ser. No. 009,753, filed Feb. 5, 1979, now abandoned.

BACKGROUND AND SUMMARY

The present invention is related to inventions disclosed in copending applications Ser. No. 894,479, filed Apr. 7, 1978, now abandoned, and Ser. No. 800,747, filed May 26, 1977, now abandoned, U.S. Pat. No. Re. 29,022, U.S. Pat. No. 4,113,180 and U.S. Pat. No. 3,954,223, and is summarized in the following objects:

First, to provide an irrigation emitter involving an emitter element enclosed in a housing arranged for attachment to a flow line which can be manufactured and assembled at minimal cost.

Second, to provide an irrigation emitter including a housing forming a chamber wherein perforated inlet and outlet walls diverge diametrically from a common apex which retains an end of an elastomeric emitter plate that is angularly movable between contact with the inlet and outlet walls to form with the outlet wall at a predetermined low pressure, a flush flow passage, the emitter plate and outlet wall defining therebetween drip flow passage operable above the flush flow pressure.

Third, to provide an irrigation emitter, as defined in the other objects, in which the housing may include an inlet in coaxial relation with the outlet and the emitter disk may close or nearly close the inlet between irrigation cycles, whereby, on initiation of an irrigation cycle, a slight delay in flush flow occurs to permit an increase in the line supply tube pressure exposed to the inlet; thus increasing the rate of movement of the emitter disk toward drip flow and increasing the number of emitters which may be used on a supply line.

Fourth, to provide an irrigation emitter, as defined in the other objects, wherein the material forming the emitter disk is yieldable to an increase in water pressure to effect a corresponding decrease in the area of the drip channel, thereby to cause approximately uniform drip flow over a range of water pressures.

Fifth, to provide an irrigation emitter, as defined in the other objects, wherein the emitter disk is provided at the discharge end of the drip passage with a deflector to maintain a slow velocity discharge.

DESCRIPTION OF THE FIGURES

FIGS. 1 through 5 illustrate an embodiment of the irrigation emitter, in which:

FIG. 1 is an enlarged longitudinal sectional view thereof taken through 1—1 of FIG. 3, showing the emitter in its pressure free state.

FIG. 2 is a longitudinal sectional view corresponding to FIG. 1, showing the emitter in position for drip flow.

FIG. 3 is a transverse sectional view taken through 3—3 of FIG. 1.

FIG. 4 is an enlarged surface view of the emitter disk.

FIG. 5 is a greatly enlarged fragmentary sectional view taken through 5—5 of FIG. 4.

FIGS. 6 through 11 illustrate another embodiment of the irrigation emitter, in which:

FIG. 6 is an enlarged end view of the housing cap.

FIG. 7 is a longitudinal sectional view taken through 7—7 of FIG. 8, showing by solid lines the emitter in its pressure free state and by broken lines in its drip flow position.

FIG. 9 is a greatly enlarged view of the energy absorbtion cavity and emitter element.

FIG. 10 is an approximately full size fragmentary view of a string of emitters joined together.

FIG. 11 is a greatly enlarged fragmentary sectional view taken through 11—11 of FIG. 10.

DETAILED DESCRIPTION

Figure 1:
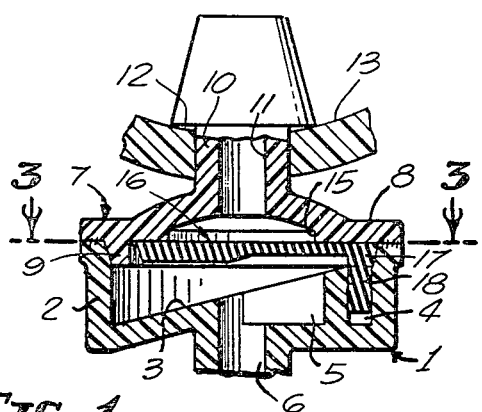
Figure 2:
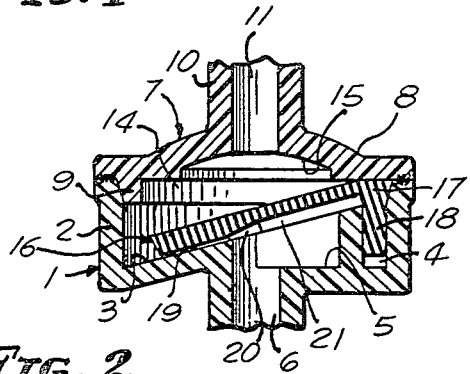
Figure 3:
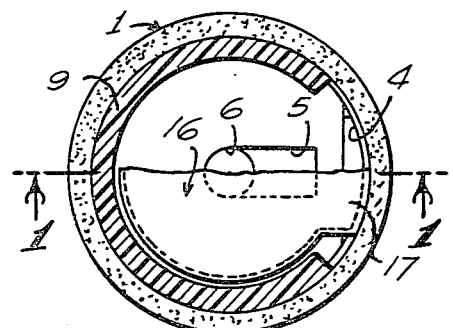
Figure 4:
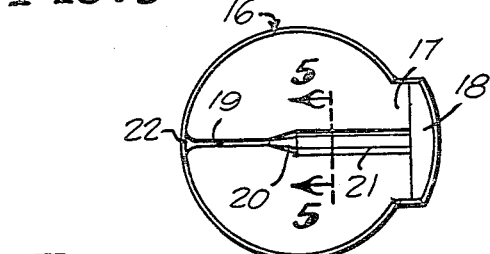
Figure 5:
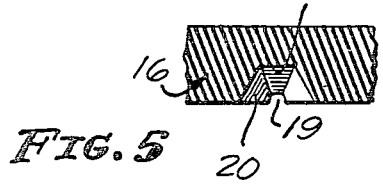
Figure 6:
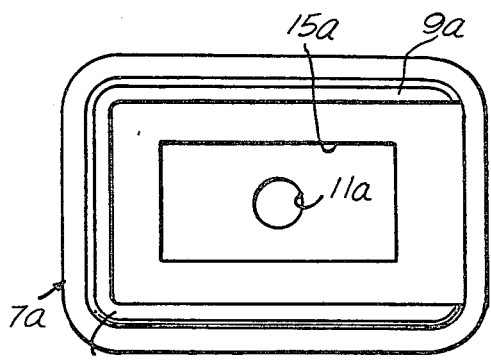
Figure 7:
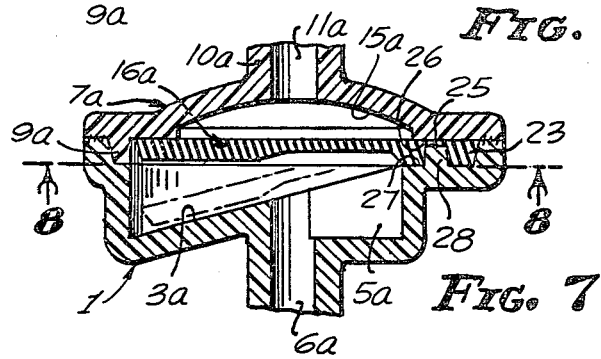
Figure 8:
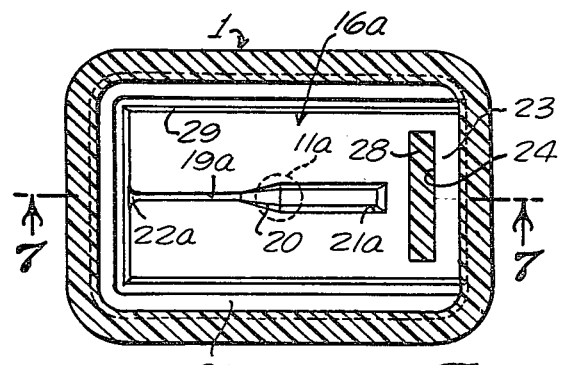

Referring to the embodiment shown in FIGS. 1 through 5, this embodiment includes a housing base 1 having a peripheral wall 2 and an essentially flat sloping bottom wall 3. Immediately beyond the raised end of the bottom surface is an exailly extending tab socket 4, and radially inwardly thereof is a depression or cavity 5 which intersects an axial outlet bore 6 centered with respect to the housing base 1.

A housing cap 7 is provided which includes a flange 8, the periphery of which is prepared for sonic wleding or other bonding attachment to the extended surface of the wall 2, and is provided with a semiperipheral guide rib 9 to aid in centering the housing cap 7 with respect to the housing base 1. The housing cap 7 includes a stem 10 having an inlet bore 11. The stem is provided with a retainer flange 12 for attachment in a conventional manner to a supply line 13, shown fragmentarily in FIG. 1. The flange 8 and bottom wall 3 diverge diametrically from the tab socket 4 and form with the wall 2 a chamber 14. The inner end of the inlet bore 11 forms a radially enlarged recess 15 exposed to the chamber 14.

Received in the chamber 14 between the flange 8 and bottom surface 4 is a circular emitter plate or disk 16. The emitter plate 16 is provided with a short radial extension 17 joined to an axially extending tab 18. The tab is received in the socket 4 and held therein by an overlying portion of the housing cap flange 8. The emitter plate 16 when in its fluid pressure free condition underlies the major portion of the flange 8 in contact with the surface of the flange exposed to the chamber 14. The periphery of the emitter plate 16 may exert a slight pressure against the peripheral surface of the flange 8 by molding the emitter so that the angle defined by the tab 18 is greater then 90% with respect to the emitter plate 16.

The surface of the emitter plate 16 which confronts the sloping bottom wall surface 3, is provided with a radial drip channel 19. The drip channel 19 is centered diametrically opposite from the axial extension or tab 18 and terminates short of the outlet bore 6. At this point, the drip channel joins a flared portion 20 which merges into an enlarged channel 21 confronting the depression 5. It is also desirable to flare the entrance end of the drip channel as indicated by 22, as such flaring at both ends of the drip channel 19 aids in obtaining constant flow over a wide range of pressures.

The embodiment shown in FIGS. 6 through 11 is, in some respects, essentially the same as the embodiment shown in FIGS. 1 through 11, except that the housings and emitter plate are rectangular; consequently similar corresponding parts are numbered with the suffix "a".

In place of the tab 18, the emitter plate 16a provided a coplanar tab 23 having a recess 24 which does not penetrate the tab 18 but terminates in a thin web 25. The housings 1a and 7a have confronting surfaces 26 and 27 which clamp the tab 23 and the housing 1 is provided with a retainer boss 28 which is received in the recess 24.

Operation of the embodiments shown in FIGS. 6 through 11 is as follows:

Between irrigation cycles, the emitter plates 16 and 16a close their respective inlet recesses 15 and 15a. Tests have indicated that the large areas of the recesses 15 and 15a are effective in providing a surge of water sufficient to cause an accelerated movement of the emitter disk to drip flow; thus, reducing the volume of water needed for flush flow and increasing the number of emitters permitted on a given irrigation line. This action is further enhanced by disposing the guide rib 9 or 9a in close proximity to the periphery of the emitter disk 16 or 16a.

Figure 9:
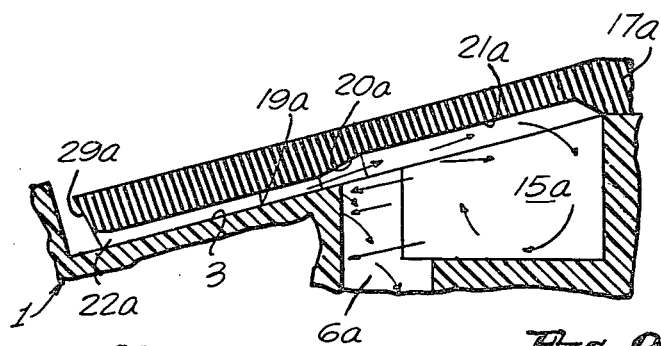

During the irrigation cycle, the enlarged channel 21 or 21a and opposed depression or cavity 5 or 5a provides a turbulant zone, as indicated in FIG. 9 which is effective in reducing the velocity of water passing through the outlet.

Figures 10, 11:
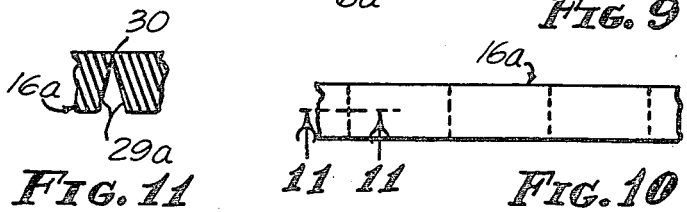

With respect to the emitter plate 16a, which is rectangular, it may be molded in end-to-end relation, as indicated in FIG. 10 or in side-by-side relation with beveled edges 29 joined by thin connecting webs 30 with minimal or no flash. Consequently, the emitter plate 16 may be formed in a continuous strip which may be fed into an automatic assembly machine.

The emitter plates 16 and 16a are formed of an elastomeric material, perferably a synthetic rubber of the silicone type, having a shore hardness in the range between sixty (60) and thirty (30) or even lower, and the thickness of the emitter disk may range between 0.040" and 0.025" (1.02 and 0.64mm) and the drip channel may range between approximately 0.015"×0.020" (0.38×0.51 mm) for one gallon (3.78 liters) per hour to 0.004"×0.005" (0.10×0.127 mm) for one fourth gallon (0.95 liters) per hour. The shore hardness, the thickness of the emitter disk 16 in the vicinity of the drip flow channel, and the dimensions of the drip flow channel are selected so that the drip flow channel diminishes in area as the water pressure increases to produce an approximately uniform flow of water over a substantial pressure range.

Having fully described our invention it is to be understood that we are not to be limited to the details herein set forth, but that our invention is of the full scope of the appended claims.

We claim:

1. An emitter adapted for installation in an intermittently operated irrigation system and comprising:
   a housing having a chamber therein defined by an inlet wall having an inlet port and an outlet wall having an outlet port, the inlet and outlet walls diverging from a common apex;
   an elastomeric emitter plate in said chamber and secured to said adapter at said apex and being normally biased to be in face-to-face contact against said inlet wall and swingable about said apex into face-to-face contact with said outlet wall;
   the faces of said emitter plate being of substantially the same shape as said inlet and outlet walls, respectively, whereby said emitter plate can swing about said apex into face-to-face contact with either of said walls without substantial bending;
   the confronting surfaces of the emitter plate and outlet wall defining momentarily below a predetermined low water pressure and while spaced apart, a flush flow water passage therebetween discharging from the outlet port;
   the confronting surfaces of the emitter plate and outlet wall defining a drip flow water passage therebetween, when in face-to-face contact.

2. The emitter as set forth in claim 1, wherein:
   (a) the confronting areas of the inlet wall, outlet wall and emitter plate are circular.

3. The emitter as set forth in claim 1, wherein:
   (a) the confronting areas of the inlet wall, outlet wall and emitter plate are rectangular.

4. The emitter as set forth in claim 1, wherein:
   (a) a cavity is provided in said outlet wall at one radial side of the outlet port and underlying the emitter plate and creating a turbulence zone.

5. A drip irrigation emitter, comprising:
   (a) a housing having peripherally joined confronting inlet wall and outlet wall diverging from a common clamping apex and defining a chamber therebetween with an end wall opposite said apex;
   (b) the inlet wall having an inlet passage; the outlet wall having an outlet passage;
   (c) an elastomeric emitter plate in said chamber, secured to said housing at said apex and having opposed surfaces confronting and of essentially the same shape as the inlet wall and outlet walls, respectively, and movable to and from face-to-face surface contact therewith without substantial bending, the emitter plate having a peripheral portion clearing the peripheries of the inlet wall and outlet wall to provide fluid communication between opposite faces of the emitter plate;
   (d) the emitter plate and outlet wall being relatively movable to effect drip and flush therethrough.

6. A drip irrigation emitter, as set forth in claim 5 wherein:
   (a) the inlet wall, outlet wall, and emitter plate are circular.

7. A drip irrigation emitter, as set forth in claim 5, wherein:
   (a) the inlet wall, outlet wall, and emitter plate are rectangular.

8. A drip irrigation emitter, as set forth in claim 5, wherein:
   (a) the drip flow passage extends radially from the outlet passage to the periphery of the emitter plate.

9. A drip irrigation emitter, as set forth in claim 5, wherein:
   (a) the outlet wall includes a depression communicating with the drip passage to form a turbulence zone effective to reduce flow from the outlet passage.

* * * * *